(12) United States Patent
McGregor et al.

(10) Patent No.: US 11,091,940 B2
(45) Date of Patent: Aug. 17, 2021

(54) WINDOW STAYS

(71) Applicant: ASSA ABLOY NEW ZEALAND LIMITED, North Shore (NZ)

(72) Inventors: Duncan Duff McGregor, Auckland (NZ); Bryce Alan Molloy, Auckland (NZ)

(73) Assignee: ASSA ABLOY NEW ZEALAND LIMITED, North Shore City (NZ)

( * ) Notice: Subject to any disclaimer, the term of this patent is extended or adjusted under 35 U.S.C. 154(b) by 17 days.

(21) Appl. No.: 16/472,397

(22) PCT Filed: Dec. 15, 2017

(86) PCT No.: PCT/NZ2017/050163
§ 371 (c)(1),
(2) Date: Jun. 21, 2019

(87) PCT Pub. No.: WO2018/117865
PCT Pub. Date: Jun. 28, 2018

(65) Prior Publication Data
US 2019/0360244 A1    Nov. 28, 2019

(30) Foreign Application Priority Data

Dec. 23, 2016  (NZ) ......................................... 727905
Oct. 27, 2017  (NZ) ......................................... 736765

(51) Int. Cl.
*E05D 15/00*     (2006.01)
*E05C 17/34*     (2006.01)
(Continued)

(52) U.S. Cl.
CPC ............... *E05C 17/34* (2013.01); *E05F 5/06* (2013.01); *E05F 11/16* (2013.01); *B21K 1/60* (2013.01);
(Continued)

(58) Field of Classification Search
CPC ............... Y10T 16/545; Y10T 16/5453; Y10T 16/5457; Y10T 16/547; Y10T 16/6298;
(Continued)

(56) References Cited

U.S. PATENT DOCUMENTS 3,451,124 A * 6/1969 Steiner .................... B29C 70/68
                                                29/527.1
3,838,537 A   10/1974 Stavenau et al.
(Continued)

FOREIGN PATENT DOCUMENTS

AU          32784/89       10/1989
AU         2009240862       6/2010
(Continued)

OTHER PUBLICATIONS

International Search Report and Written Opinion for International (PCT) Patent Application No. PCT/NZ2017/050163, dated May 25, 2018, 18 pages.
(Continued)

*Primary Examiner* — Chuck Y Mah
(74) *Attorney, Agent, or Firm* — Sheridan Ross P.C.

(57) ABSTRACT

A window stay including a frame mounting plate (10); a sash mounting plate (11); a short arm (12) coupled by pivots at each end to the frame mounting plate (10) and the sash mounting plate (11); and an elongate long arm (13) coupled by pivots at each end to the frame mounting plate (10) and sash mounting plate (11), wherein the stay includes a first stop (33) and a second stop (102) acting as limiters at a fully open position of the window stay.

17 Claims, 17 Drawing Sheets

(51) Int. Cl.

| | | |
|---|---|---|
| *E05F 5/06* | (2006.01) | |
| *E05F 11/16* | (2006.01) | |
| *B21K 1/60* | (2006.01) | |
| *E05D 11/06* | (2006.01) | |
| *E05D 11/10* | (2006.01) | |
| *E05D 15/32* | (2006.01) | |
| *E05D 15/46* | (2006.01) | |
| *F16B 5/04* | (2006.01) | |
| *F16B 19/10* | (2006.01) | |

(52) U.S. Cl.
 CPC ............ *E05D 11/06* (2013.01); *E05D 11/10* (2013.01); *E05D 15/32* (2013.01); *E05D 15/466* (2013.01); *E05Y 2900/148* (2013.01); *F16B 5/04* (2013.01); *F16B 19/10* (2013.01)

(58) Field of Classification Search
 CPC ......... E05Y 2900/148; E05Y 2800/696; E05D 15/30; E05D 15/32; E05D 15/406; E05D 15/408; E05D 15/466; E05D 15/42; E05D 15/44; E05D 15/16; E05D 15/165; E05D 3/18; E05D 13/08; E05D 13/10; E05D 11/06; E05D 11/10; E05F 11/00; E05F 11/34; E05F 5/06; E05F 11/16; E05F 11/12; E05F 11/08; E05C 17/04; E05C 17/34; F16B 5/04; F16B 19/10
 See application file for complete search history.

(56) References Cited

U.S. PATENT DOCUMENTS

| | | | | |
|---|---|---|---|---|
| 4,226,002 A | * | 10/1980 | Davis | E05D 15/44 16/273 |
| 4,441,835 A | * | 4/1984 | Davis | E05D 15/466 403/24 |
| 4,582,435 A | * | 4/1986 | Davis | E05D 11/081 384/129 |
| 4,689,852 A | * | 9/1987 | Buckley | E05D 15/44 16/341 |
| 4,703,540 A | * | 11/1987 | Davis | E05D 15/466 16/337 |
| 4,799,288 A | * | 1/1989 | Kimizawa | F16C 11/0657 16/2.1 |
| 4,800,678 A | * | 1/1989 | Loos | E05D 15/5217 16/360 |
| 4,897,004 A | | 1/1990 | Norton | |
| 5,090,754 A | | 2/1992 | Thompson | |
| 5,210,908 A | | 5/1993 | Bucher | |
| 5,450,654 A | * | 9/1995 | Sullivan | E05C 17/32 16/362 |
| 5,452,543 A | * | 9/1995 | VonWald | E05F 11/34 16/95 R |
| 5,509,177 A | | 4/1996 | Hindin et al. | |
| 5,702,660 A | | 12/1997 | Allott et al. | |
| 5,964,011 A | * | 10/1999 | Ruston | E05D 7/0054 16/239 |
| 6,138,325 A | | 10/2000 | Figliola et al. | |
| 6,272,728 B1 | * | 8/2001 | Lenac | B21J 15/04 29/458 |
| D459,208 S | * | 6/2002 | Figliola | E05D 15/466 D8/402 |
| 6,397,434 B1 | * | 6/2002 | Cheal | E05D 3/145 16/289 |
| 2007/0289100 A1 | * | 12/2007 | Lake | E05D 15/30 16/362 |
| 2010/0000051 A1 | | 1/2010 | See | |
| 2011/0250377 A1 | | 10/2011 | Qin | |
| 2012/0117759 A1 | * | 5/2012 | Lambert | E05D 15/00 16/368 |

FOREIGN PATENT DOCUMENTS

| | | | | |
|---|---|---|---|---|
| CN | 86102493 | | 6/1987 | |
| CN | 1133020 | | 12/2003 | |
| CN | 201214932 | | 4/2009 | |
| CN | 203008615 | | 6/2013 | |
| CN | 103485623 | | 1/2014 | |
| CN | 105221537 | | 1/2016 | |
| CN | 104190840 | | 7/2016 | |
| CN | 104265102 | | 9/2016 | |
| CN | 106030126 | | 10/2016 | |
| CN | 206220711 | | 10/2016 | |
| CN | 106382062 | | 2/2017 | |
| CN | 106545235 | | 3/2017 | |
| CN | 106639693 | | 5/2017 | |
| CN | 206174715 | | 5/2017 | |
| CN | 107060542 | | 8/2017 | |
| EP | 0207761 | | 1/1987 | |
| EP | 1462596 | | 9/2004 | |
| GB | 276842 | | 9/1927 | |
| GB | 2087972 A | * | 6/1982 | ........... E05D 15/466 |
| GB | 2105780 A | * | 3/1983 | ........... E05D 15/466 |
| GB | 2184778 | | 7/1987 | |
| GB | 2217778 | | 11/1989 | |
| GB | 2236801 | | 4/1991 | |
| GB | 2236802 | | 4/1991 | |
| GB | 2257199 A | * | 1/1993 | ............. E05C 17/32 |
| GB | 2276203 | | 9/1994 | |
| GB | 2337951 | | 12/1999 | |
| GB | 2509632 | | 7/2014 | |
| JP | 3172348 | | 6/2001 | |
| JP | 2003315747 A | * | 11/2003 | |
| JP | 3180477 | | 12/2012 | |
| JP | 3180477 U | * | 12/2012 | ........... E05D 15/466 |
| RU | 2229629 | | 5/2004 | |
| WO | WO 1988/000638 | | 1/1988 | |
| WO | WO 1994/021879 | | 9/1994 | |
| WO | WO 96/10680 | | 4/1996 | |
| WO | WO 1996/010681 | | 4/1996 | |
| WO | WO 2004/067248 | | 8/2004 | |
| WO | WO 2012/050929 | | 4/2012 | |
| WO | WO 2015/009166 | | 1/2015 | |
| WO | WO 2016/181169 | | 11/2016 | |
| WO | WO 2017/046434 | | 3/2017 | |

OTHER PUBLICATIONS

International Preliminary Report on Patentability for International (PCT) Patent Application No. PCT/NZ2017/050163, dated Dec. 4, 2018, 18 pages.
Official Action with English Translation for China Patent Application No. 2017800799482, dated May 8, 2020, 19 pages.
Official Action for Australia Patent Application No. 2017380467, dated Sep. 11, 2020, 3 pages.

* cited by examiner

WINDOW STAYS

CROSS REFERENCE TO RELATED APPLICATIONS

This application is a national stage application under 35 U.S.C. 371 and claims the benefit of PCT Application No. PCT/NZ2017/050163 having an international filing date of 15 Dec. 2017, which designated the United States, which PCT application claimed the benefit of New Zealand Patent Application No. 727905 filed 23 Dec. 2016 and New Zealand Patent Application No. 736765 filed 27 Oct. 2017, the disclosures of each of which are incorporated herein by reference.

FIELD

This invention relates to a window stay.

BACKGROUND

Four bar window stays include a frame mounting plate or plates and a sash mounting plate (or plates) which are coupled by a pair of arms. Typically, one arm is significantly shorter than the other arm. A pair of such stays mounted between a window sash and window frame provide a means of controlling the opening and closing of the sash. The window sash may be opened to 90 degrees relative to the window frame. Four bar stays for hung sashes which open to 90° may provide access to the outer surface of the glass for cleaning purposes. Improvements may be made to stays by lowering the cost, reducing the size, and/or increasing durability and weight carrying capacity It is an object of the invention to provide an improved window stay or to at least provide the public or industry with a useful choice.

SUMMARY

According to a first example embodiment there is provided a window stay, including: a frame mounting plate; a sash mounting plate; a short arm coupled by pivots at each end to the frame mounting plate and the sash mounting plate; and an elongate long arm coupled by pivots at each end to the frame mounting plate and sash mounting plate, wherein the stay includes a first stop and a second stop acting as limiters at a fully open position of the window stay.

Optionally, the first stop is a projection from the frame mounting plate configured to engage with the short arm.

Optionally, the projection from the frame mounting plate is configured to engage with a recess in the short arm.

Optionally, the projection from the frame mounting plate is integrally formed with the frame mounting plate.

Optionally, the second stop is a projection from the short arm configured to engage with the frame mounting plate.

Optionally, the second stop is configured to engage with a perimeter of the frame mounting plate.

Optionally, the second stop is integrally formed with the short arm.

Optionally, the frame mounting plate is engaged with an elongate disk having longitudinal edges.

Optionally, the disk is of plastics material and has a recess in which the frame mounting plate is mounted.

Optionally, the disk includes a channel in which the second stop travels as the stay moves between closed and open positions.

Optionally, the geometry of the stay is such that, in a closed position of the stay, the pivot coupling the long arm to the sash mounting plate is situated between the pivot coupling the frame mounting plate to the short arm and the pivot coupling the sash mounting plate to the short arm.

Optionally, at the fully open position of the window stay the sash mounting plate is at substantially 90 degrees to the frame mounting plate.

Optionally, the sash mounting plate includes a sash mounting plate stop to act as a limiter at the fully open position of the stay.

Optionally, the sash mounting plate stop is a projection from the sash mounting plate configured to stop the long arm.

Optionally, the sash mounting plate stop is integrally formed with the sash mounting plate.

Optionally, the sash plate stop is surrounded by a bulge in the sash mounting plate.

Optionally, the stop is a V-shaped stop.

Optionally, an edge of the V-shaped stop is flush with a surface of an arm at the fully open position of the stay.

Optionally, the V-shape stop has an axis of symmetry aligned with the length of the sash mounting plate.

Optionally, the frame mounting plate includes a pressed form along a longitudinal axis of the frame mounting plate.

Optionally, the pressed form is a rib.

Optionally, the pressed form is along a longitudinal edge of the frame mounting plate.

Optionally, the pressed form is at a high-load area of the frame mounting plate.

Optionally, the pressed form creates a step.

Optionally, the pressed form includes folds extending the frame mounting plate in both directions from the primary plane of the frame mounting plate.

According to a second example embodiment, there is provided an arm of a window stay including; a central portion along a substantial length of the arm; and offset portions on either side of the central portion, wherein the central portion is substantially flat and configured to bear on an adjacent surface in use.

Optionally, the elevation between the central portion and the offset portions decreases towards an end of the arm.

Optionally, the arm is a long arm of a window stay.

Optionally, the central portion is an elongate strip.

Optionally, the offset portions are ribs.

Optionally, the ribs are angled at between 40 to 50 degrees relative to a plane of the arm.

Optionally, the arm is a short arm of a window stay.

Optionally, the central portion is substantially triangular.

Optionally, the offset portions include flat sections substantially parallel to the central portion.

According to a third example embodiment, there is provided a method of manufacturing a rivet including the steps of: a) drawing the rivet in a first direction, b) piercing a central aperture of the rivet; and c) blanking an outer diameter of the rivet at a second direction to the first direction.

Optionally, the second direction is between 170 to 190 degrees to the first direction Optionally, the second direction is about 180 degrees to the first direction.

Optionally, blanking the outer diameter of the rivet uses a blanking punch including a chamfer along an outer perimeter of the blanking punch.

According to a fourth example embodiment there is provided a window stay, including: a frame mounting plate; a sash mounting plate; a short arm including apertures to couple by pivots at each end to the frame mounting plate and the sash mounting plate; an elongate long arm including apertures to couple by pivots at each end to the frame mounting plate and sash mounting plate, and a washer integrally moulded onto one or more of the apertures.

Preferably the apertures are shaped to retain the washers relative to the arms.

Preferably the apertures include protrusions which retain the washers relative to the arms.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which:

FIG. 5b is a perspective view of the rivet of FIG. 5a;
FIG. 5c is a side view of the rivet of FIG. 5a;
FIG. 7b is a top view of the frame mounting plate of FIG. 7a;
FIG. 12a is a top view of a sash mounting plate connection to a long arm with a stop as shown in FIG. 11;
FIG. 12b is a cross section through B-B of FIG. 12a;
FIG. 13a is a partial top view of a sash mounting plate connection to a long arm according to another embodiment;
FIG. 13b is a cross section through B-B of FIG. 13a;
FIG. 14a is a side view of the sash mounting plate of FIG. 13a.

DETAILED DESCRIPTION

Overview

Four bar window stays include a frame mounting plate or plates and a sash mounting plate (or plates) which are coupled by a pair of arms. Typically, one arm is significantly shorter than the other arm. A pair of such stays mounted between a window sash and window frame provide a means of controlling the opening and closing of the sash. The window sash may be opened up to 90° relative to the window frame. Four bar stays for hung sashes which open to 90° may provide access to the outer surface of the glass for cleaning purposes.

In broad terms, described embodiments may include:
A window stay with two or more stops, which minimizes the risk of the window stay buckling when fully opened under load;
A short arm of a window stay including strategically placed strengthening forms/contours.
A long arm of a window stay including strengthening forms/contours along almost the entire length of the arm; and/or
A rivet designed with a concave underside, minimizing outward-extrusion of the washer.
A short arm or long arm with washers integrally moulded onto one or more apertures.
A window stay including a stop on the sash plate configured to act as a limiter at the fully open position of the stay.
A frame plate of a window stay including strategically placed strengthening forms/contours.

Stay Structure and Components

Figure 1:
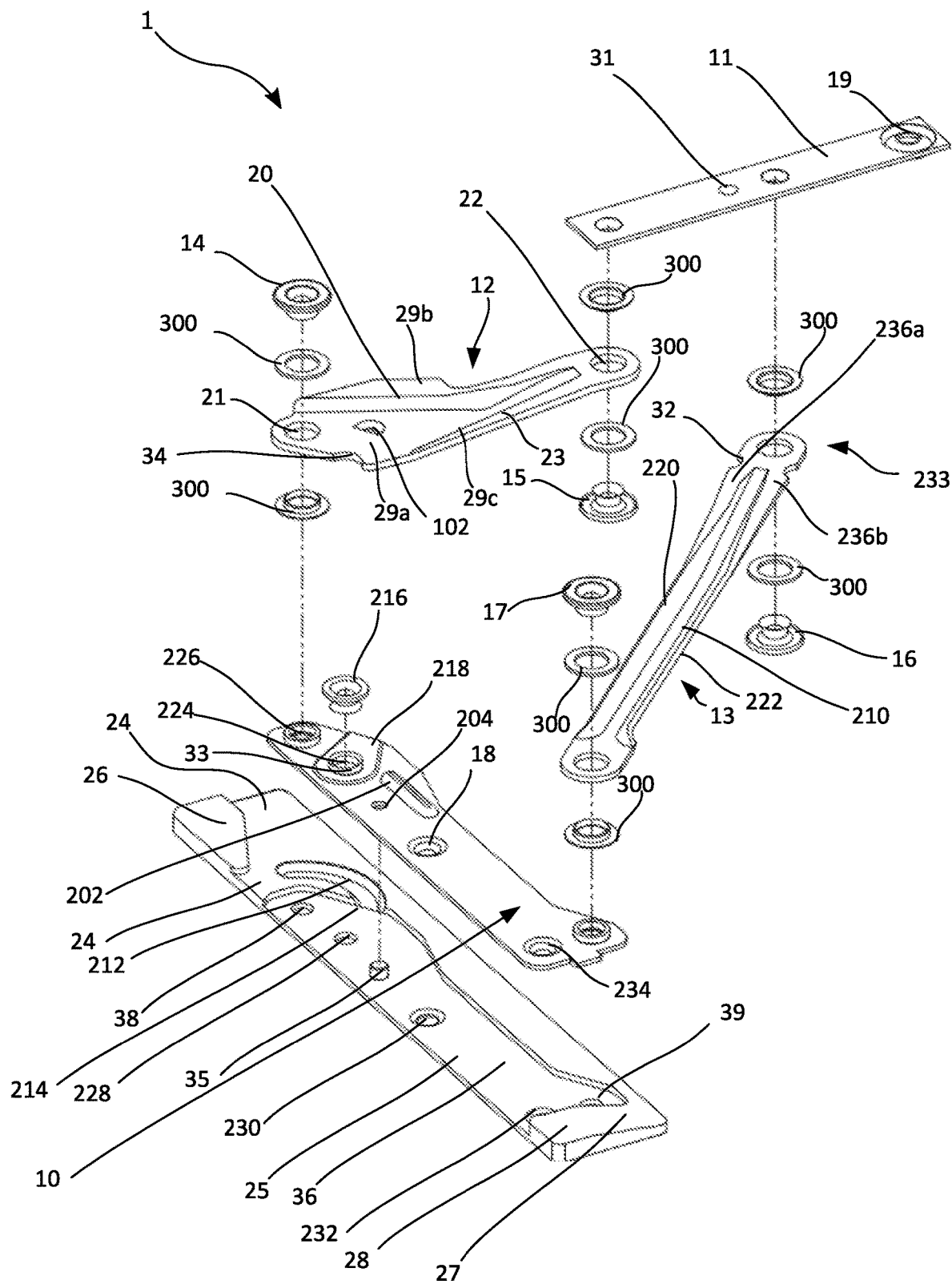
FIG. 1 is an exploded perspective view of a window stay.
Figure 2:
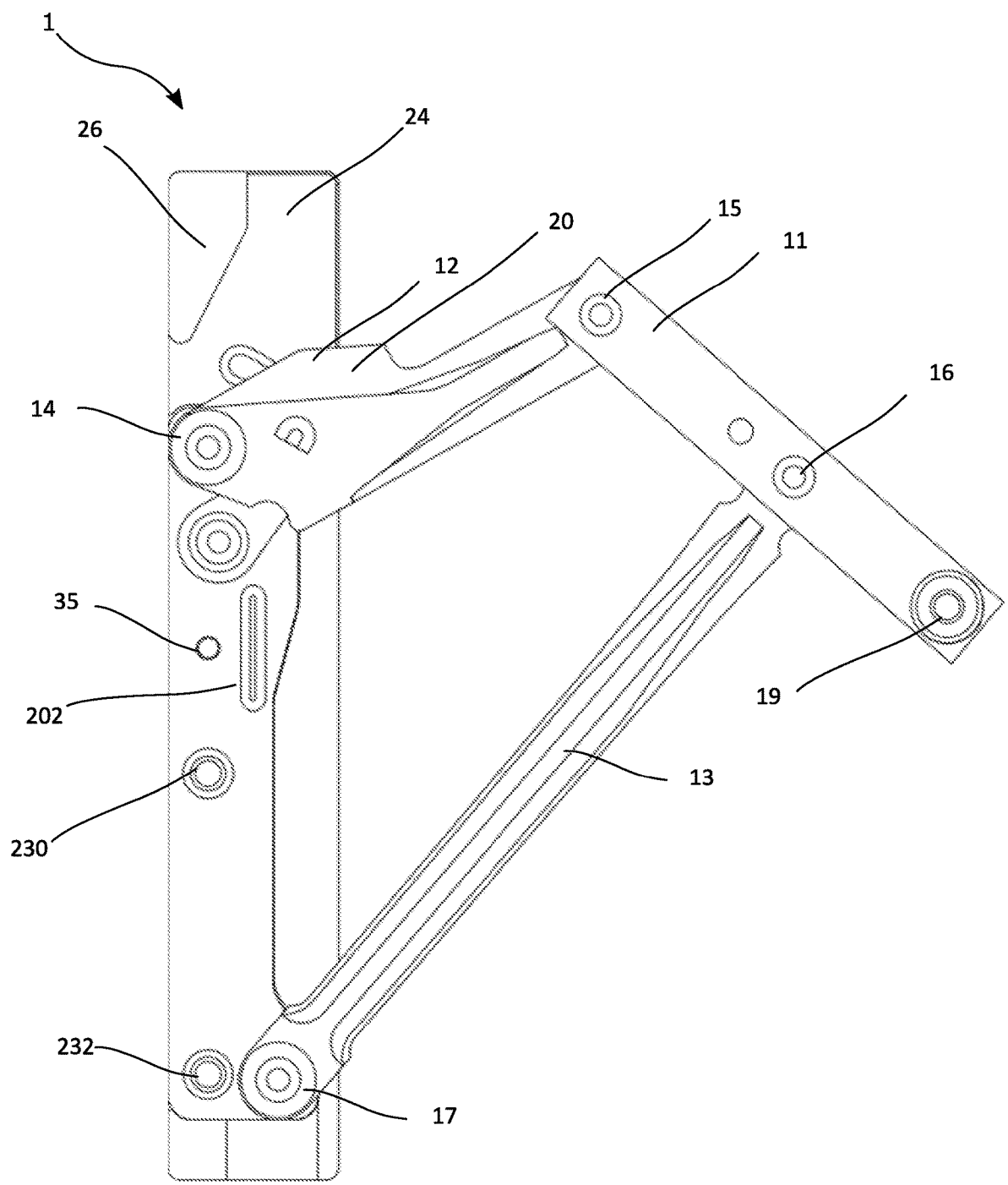
FIG. 2 is a top view of a partially open window stay.
Figure 3:
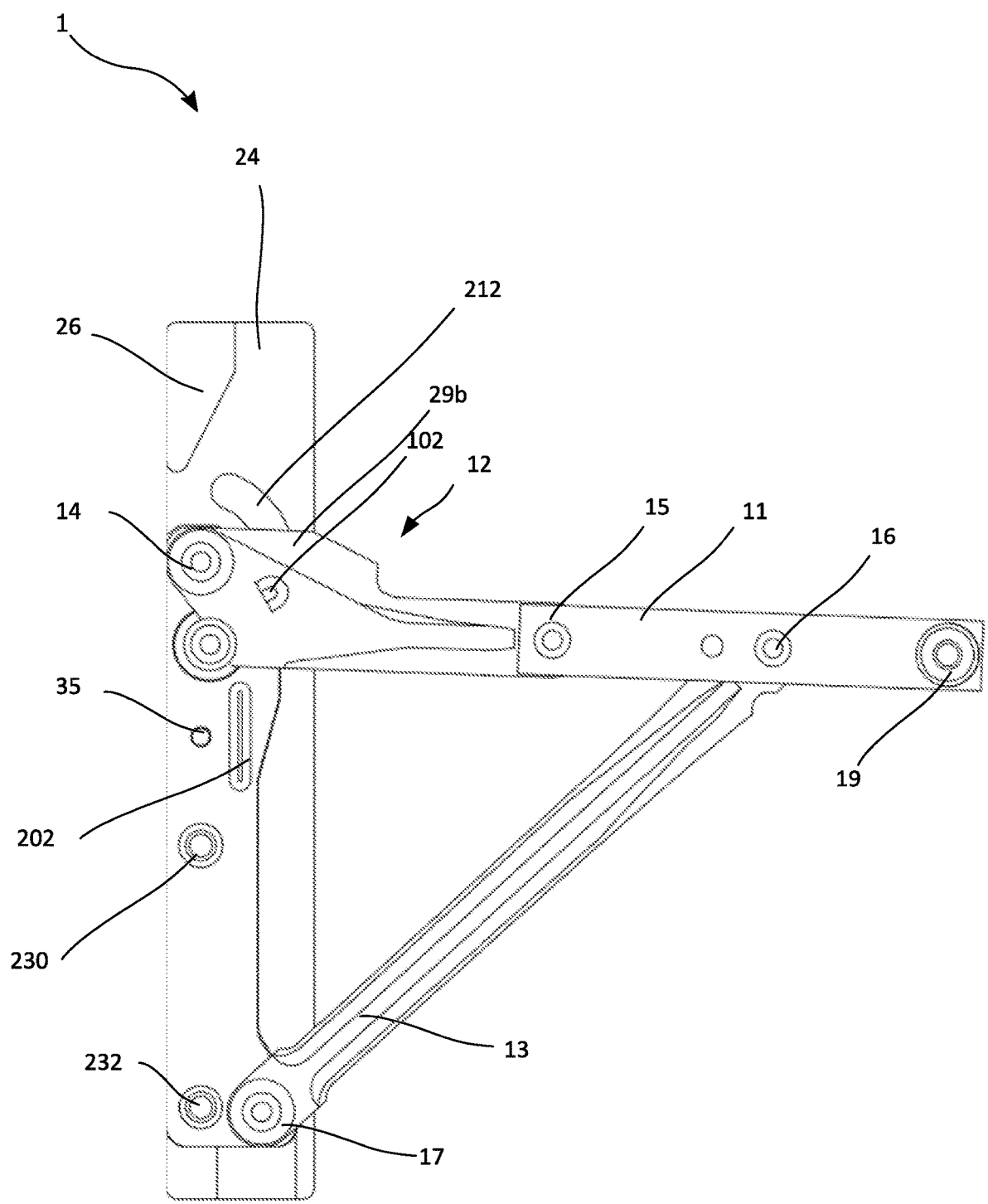
FIG. 3 is a top view of a fully open window stay.
Figure 4:
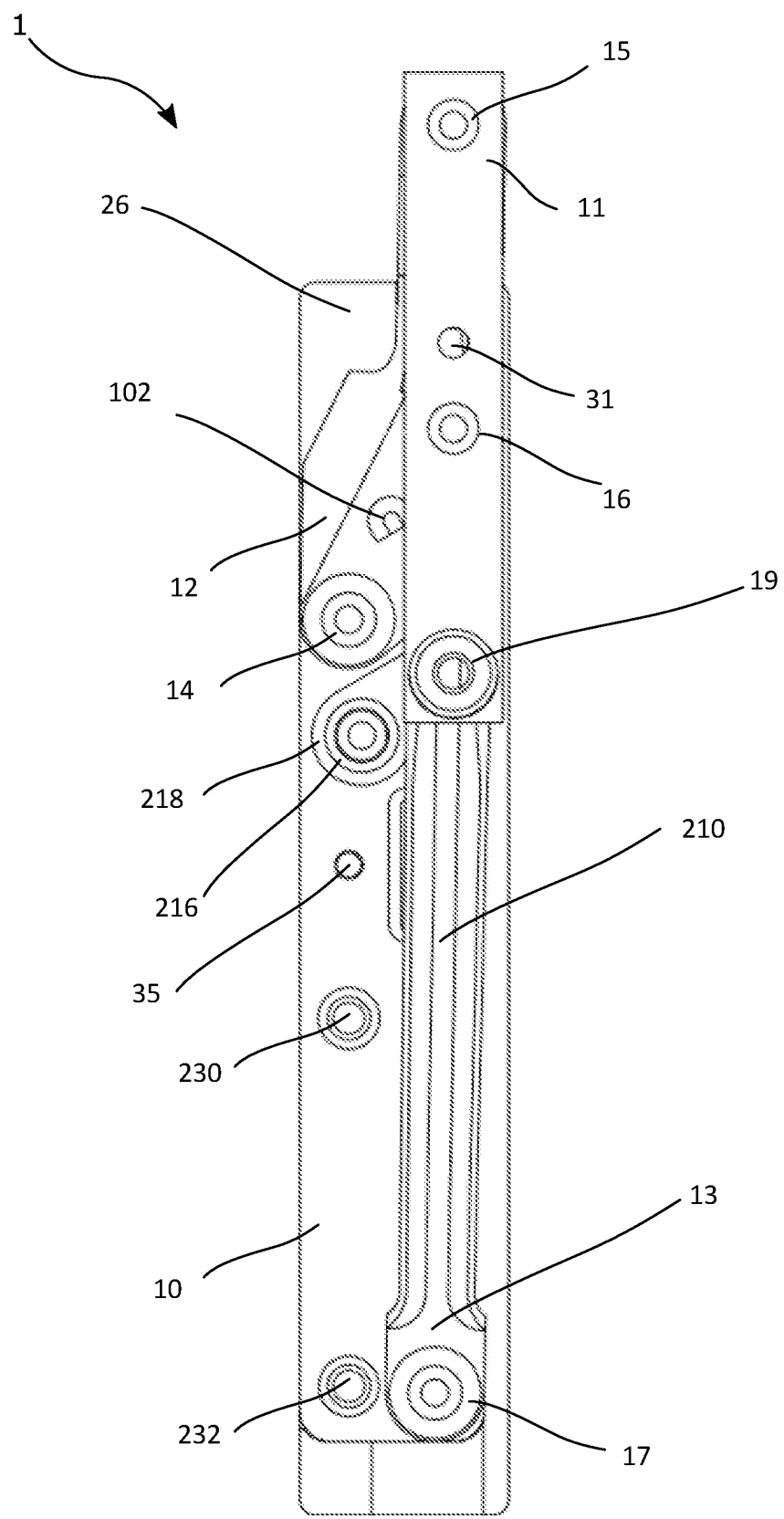
FIG. 4 is a top view of a closed window stay.

FIG. 1 is an exploded perspective view of a window stay according to an example embodiment. FIG. 2 is a top view of a partially open window stay, FIG. 3 is a top view of a fully open window stay, and FIG. 4 is a top view of a closed window stay. In the fully open position of the window stay, the sash mounting plate 11 is at substantially 90 degrees to the frame mounting plate. In other embodiments, the stay 1 may open to a greater or lesser extent.

The window stay, being of a 4 bar design includes a frame mounting plate 10, a sash mounting plate 11, a short arm 12 and a long arm 13. The frame mounting plate 10 mounts on a disk 24 which attaches to a window frame. The sash mounting plate 11 mounts directly to the window sash. The components can include suitable strengthening ribs, recesses, forms and the like.

These components (which may be of stainless steel or aluminum construction) are coupled together by pivot points (which may be of a friction type) and openings for fastening the stay 1 to the sash and frame of the window. In the described embodiments the pivot points are riveted, associated with corresponding washers 300.

Stay Linkage

The frame and sash mounting plates 10, 11 can be provided with openings 18, 19 and 234 respectively through which fasteners can be passed to fasten the plates 10,11 to the window frame and sash respectively. Fasteners can also be passed through the pivot points for use in attaching the stay 1 to the window sash and frame. In the drawings the pivot points are as follows:

Pivot point 14 is where the short arm 12 connects to the frame mounting plate 10

Pivot point 15 is where the short arm 12 connects to the sash mounting plate 11

Pivot point 16 is where the long arm 13 connects to the sash mounting plate 11

Pivot point 17 is where the long arm 13 connects to the frame mounting plate 10.

Frame Mounting Plate

A frame mounting plate 10 includes an opening 226 for receiving a rivet 14 on which the short arm 12 pivots relative to the frame mounting plate 10. It also includes a raised section 218 including a hollow projection 33 surrounding an opening 224. The opening 224 is configured to receive rivet 216. As will be discussed in more detail below, the projection 33 acts a stop for the short arm 12 when the window is opened.

The frame mounting plate 10 further includes a pressed form 202. Additional openings 18, 234 may be provided for attaching the frame mounting plate to the disk and/or a window frame. These may align with corresponding openings 230 and 232 respectively of the disk 24. The frame mounting plate 10 may have a thickness of about 1.4 to 1.6 mm.

Figure 7A:
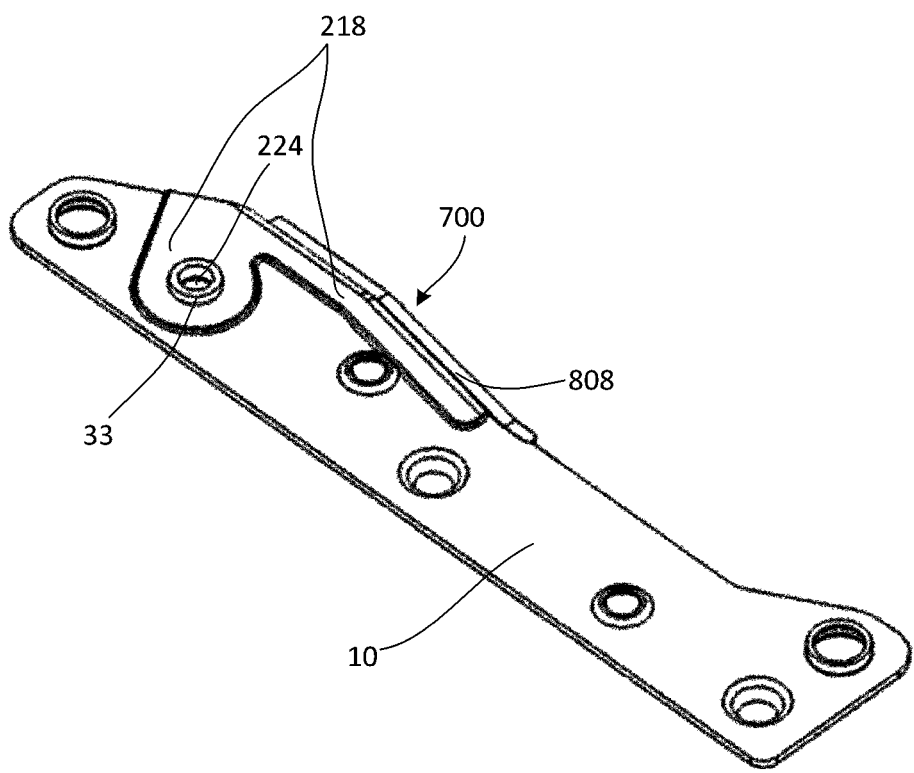
FIG. 7a is a perspective view of a frame mounting plate according to a second embodiment.

FIG. 7a shows a frame mounting plate 10 according to a second embodiment. The frame mounting plate 10 of the second embodiment similarly includes a raised section 218 including a hollow projection 33 surrounding an opening 224.

Figure 7B:
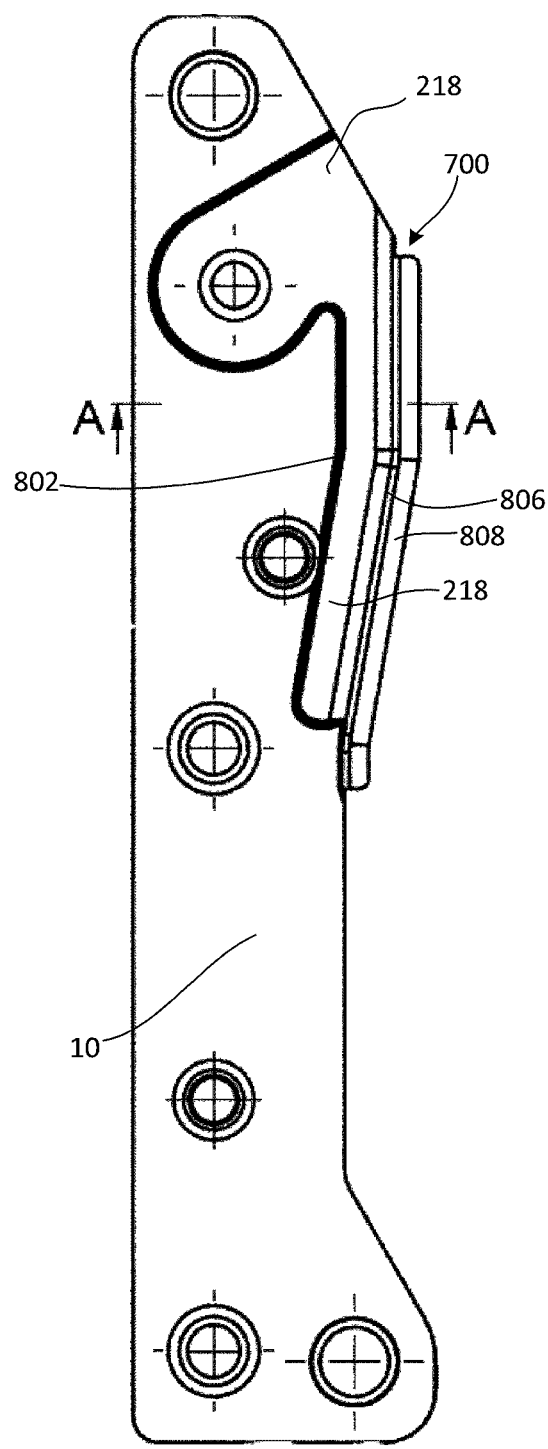
Figure 7C:
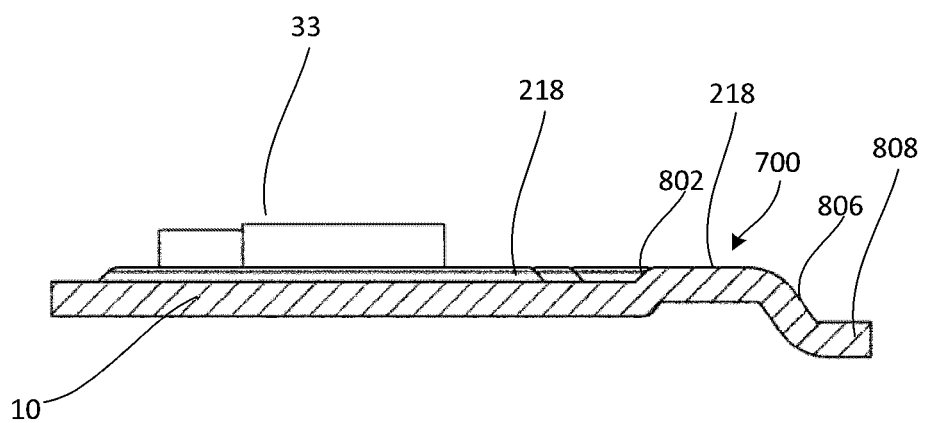
FIG. 7c is cross section through A-A of the frame mounting plate of FIG. 7b.

In the embodiment of FIGS. 7a to 7c, a pressed form 700 is provided. FIG. 7c shows a cross sectional through A-A of FIG. 7b. This shows how the frame mounting plate 10 folds at two positions 802 and 806, forming a pressed form.

Figure 8A:
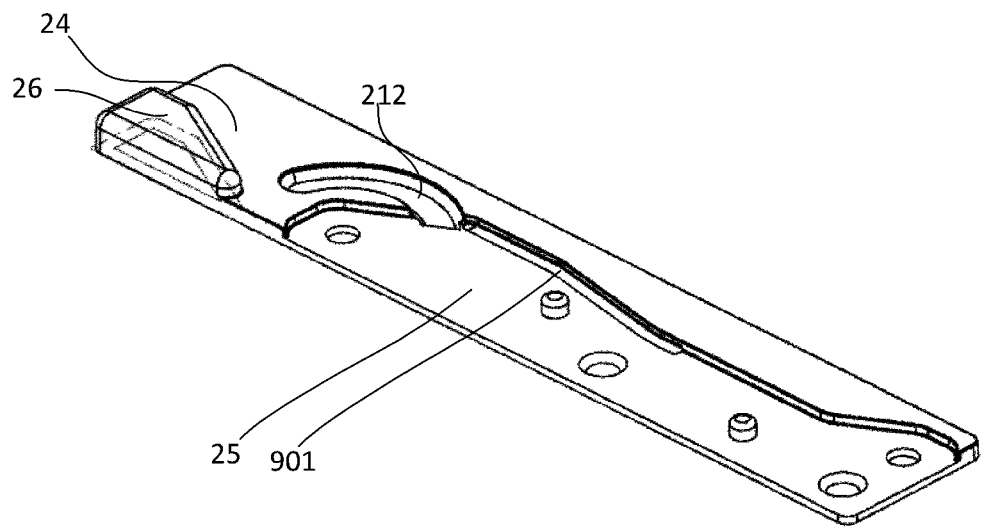
FIG. 8a is a top perspective view of a disk according to the second embodiment.
Figure 8B:
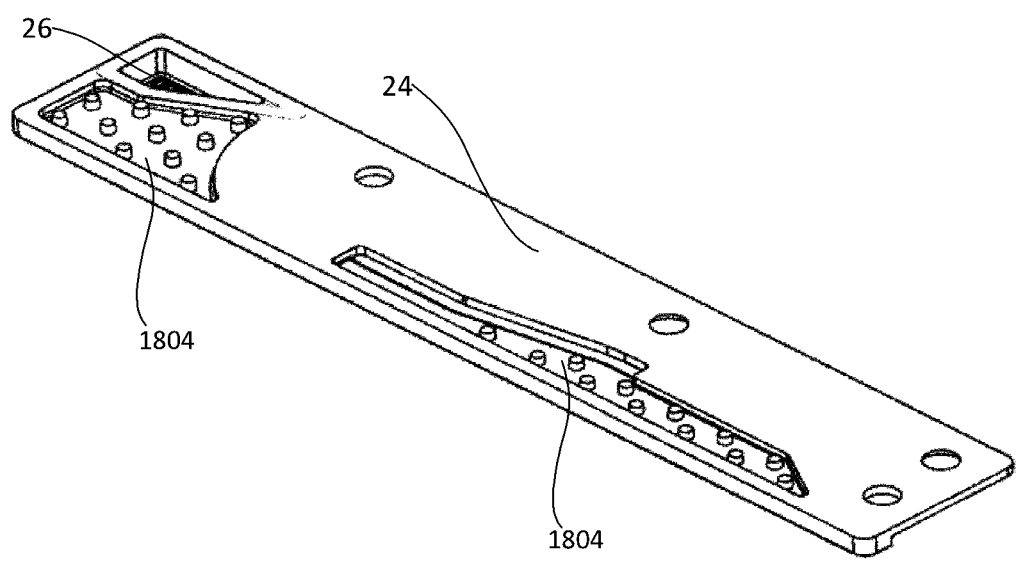
FIG. 8b is a bottom perspective view of a disk according to the second embodiment.

An outermost edge 808 of the frame mounting plate 10 located by the pressed form 700 may be lowered relative to the primary plane of the frame mounting plate 10. As shown in FIG. 8a, the lowering allows the plastic disk 24 to insert into a slot 901 (which in other variations may be an aperture) in the plastic disk 24 as shown in FIG. 8a. FIG. 8a shows a perspective view of a disk 24 according to the second embodiment, configured to retain the frame mounting plate 10 of FIG. 7a. FIG. 8b shows an underside perspective view of the disk 24 of FIG. 8a. The underside of the disk 24 may include hollowed out sections 1804.

This pressed form 700 aids in retaining the frame mounting plate to the disk. The pressed form 700 also strengthens the frame mounting plate. In embodiments with a stepped frame mounting plate as shown in FIGS. 7a to 7c, the material thickness of the frame mounting plate 10 may be reduced to 1.2 mm relative to the embodiments shown in FIGS. 1 to 4. This thickness matches the thickness of other window hardware products, allowing raw material to be consolidated, and the use of existing/standard press forms to be used for the countersinks and other features.

FIG. 7c shows a cross section of the frame mounting plate shown in FIG. 7b, through the line A-A. The pressed form 700 includes an upwardly sloping section 802, which may be about 0.5 mm in height, flattening out at a raised section 218 for about 3 mm, and a downwardly sloping section 806 of about 2 mm. The outermost edge 808 may be about 2 mm wide. While particular measurements have been given, it is to be understood that different sized stays would use different measurements.

The pressed form is preferably configured in a high-load area of the frame mounting plate. This configuration strengthens the frame mounting plate 10, by providing a greater height difference at the edge of the frame mounting plate, which is a relatively high load area (meaning it is an area of the frame mounting plate 10 which is subject to a relatively large amount of stress in use). As a result, the material thickness of the frame mounting plate may be reduced to about 1.2 mm.

The angle of the sloped section/s 802 and 806 relative to a primary plane of the frame mounting plate 10 may range between 45 degrees to 90 degrees. In the shown embodiment in FIG. 7c, the angle at which the downwardly sloping section 806 drops relative to the plane of the frame plate is about 55 degrees. The pressed form 700 is provided in high-load area/s of the frame mounting plate 10. As the pressed form 700 extends the frame plate in both directions relative to the plane of the frame mounting plate, the overall cross sectional width of the frame mounting plate 10 may be about 2.5-3.5 mm. In the shown variations of the second embodiment, the rising and subsequent lowering of the frame mounting plate profile provides a total height change of 3.1 mm which strengthens the frame mounting plate.

Figure 9:
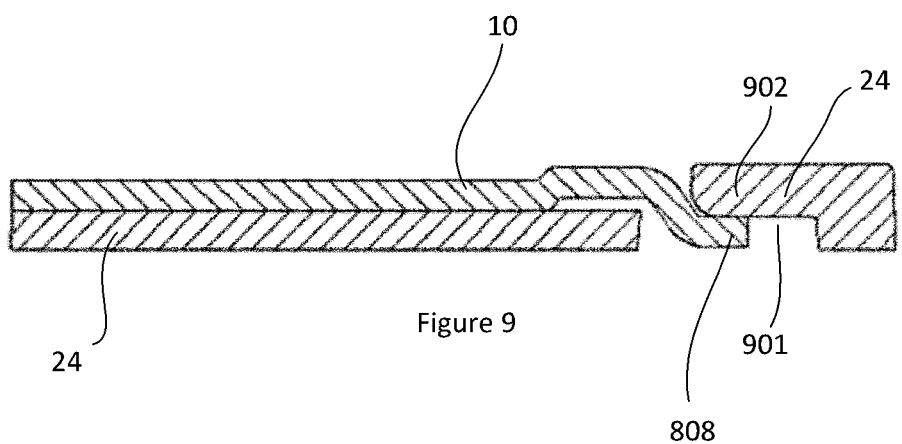
FIG. 9 is a cross section through A-A of the frame mounting plate of FIG. 7b slotted into a disk.

FIG. 9 shows a cross section of the frame mounting plate 10 located in the disk 24 of FIG. 8b. The outer edge 808 of the frame mounting plate 10 slots into a slot 901 in the disk under a ridge 902 of the disk. In another embodiment, the frame mounting plate rests inside an aperture in the disk rather than slotted into the disk.

Short Arm

Referring again to FIGS. 1 to 4, the short arm 12 includes a central portion 29a and raised or offset portions 29b and 29c on either side of the central portion 29a. The elevation between the central portion 29a and the raised/offset portions 29b and 29c decreases towards an end of the short arm 12 (towards the end which connects to the sash mounting plate via pivot point 15). The central portion 29a ramps upwards towards the level of the raised portions towards the end of the short arm 12 connecting to the sash mounting plate. The offset portions 29b and 29c are substantially aligned on a plane to provide support for the arm.

The short arm 12 includes a two-part step or fold 20 (the step 20 corresponding to raised portion 29b). This fold line/fold 20 lies at an angle to the line (not shown) extending between the centers of the openings 21 and 22 through which pivot points 14 and 15 pass. Thus fold 20 can be described as passing diagonally across the width of the short arm 12 before veering to remain parallel to the opposing side of the arm. From the opening 22 toward the recess 34 runs a second fold 23 (corresponding to the raised portion 29c). This fold 23 forms a mirror to the second stage of fold line 20 which fades out as it extends along toward recess 34 (as it does not change direction in the same way as fold 20).

The short arm further includes a D stop 102, which acts with an additional stop to reduce force on the rivet 14, as will be discussed in more detail below. A recess 34 of the short arm is configured to engage with the projection 33 of the frame mounting plate 10.

Sash Mounting Plate

Figure 10:
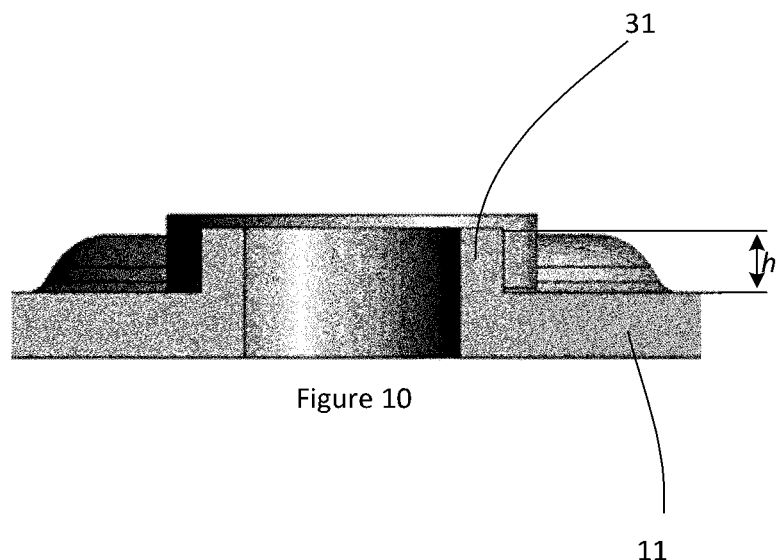
FIG. 10 is a cross section of a sash mounting plate stop.

A stop 31 engaging with the recesses 32 forms a limiter at the fully open position to prevent damage in the event the window is opened forcefully creating a dynamic load such as, for example, a high wind gust. An opening 19 may be provided through which fasteners can be used for attaching the sash mounting plate to a window. Fasteners can also be inserted through the apertures in the pivot points 15 and 16 for attachment to the window. FIG. 10 shows a detailed view of the stop 31. The stop 31 protrudes from the sash mounting plate 11 a height h. A fastener may be driven through the stop in the sash mounting plate and into the window sash.

Figure 11:
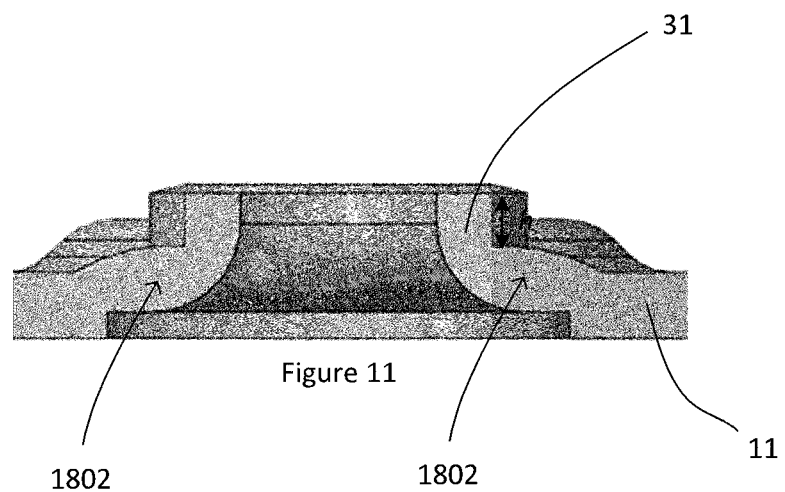
FIG. 11 is a cross section of a sash mounting plate stop according to another embodiment.
Figures 12A, 12B:
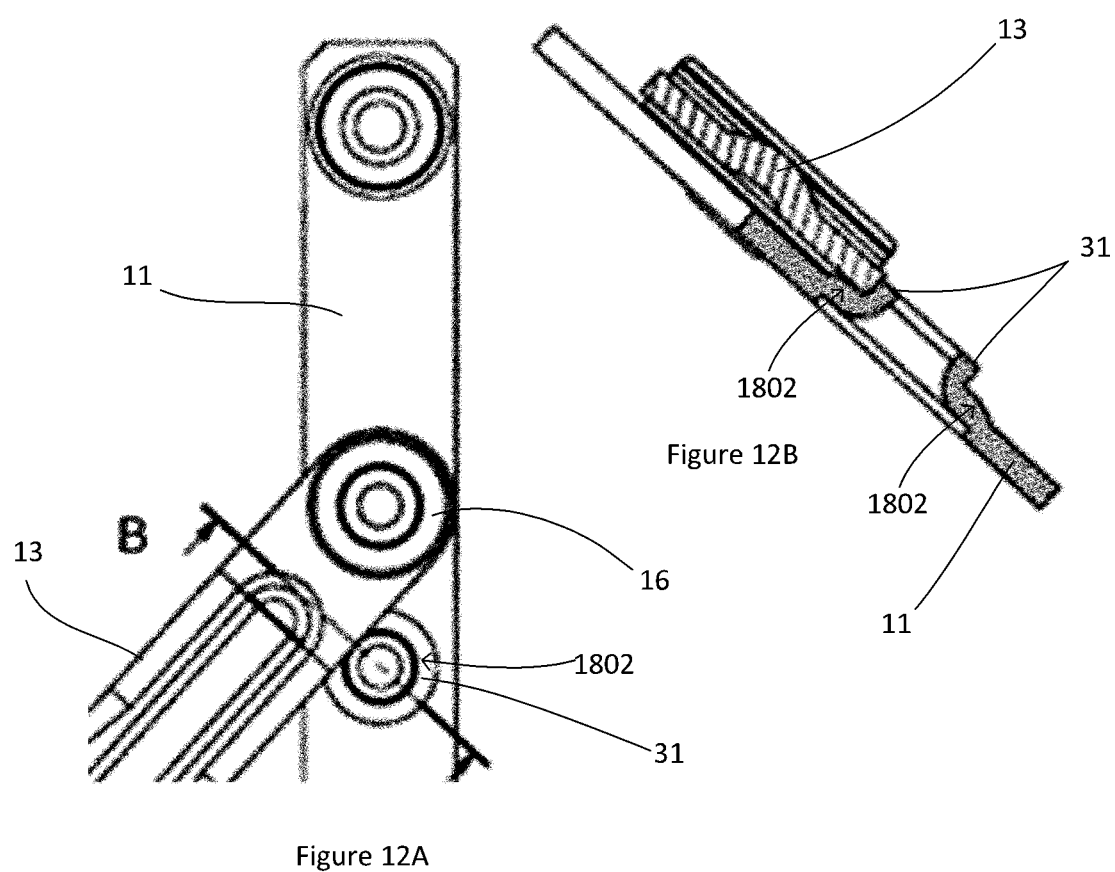

FIG. 11 shows a detailed view of a stop 31 according to another embodiment. The stop 31 includes a raised section/bulge 1802 and protrudes from the sash mounting plate. FIG. 12a is a top view of a sash mounting plate connection to a long arm with a stop as shown in FIG. 11, and FIG. 12b is a cross section through B-B of FIG. 12a;

The bulge 1802 at the base of the sash mounting plate stop decreases the length of the protruding height h of the stop 31. This increases the strength of the stop as there is less distance, and thus less leverage, between where the long arm intersects with the stop 31 and the junction with the sash mounting plate.

When the window is opened with force, the long arm 13 will, at a particular load, override and deform the vertical section of the sash mounting plate stop 31 rather than bending and damaging itself. As the damage to the sash mounting plate stop 31 is limited to the top it allows the long arm 13 to return back over the bulge 1802 and continue normal operation without any mechanical damage caused to the long arm 13 by not being able to override the vertical section of the sash mounting plate stop 31 as shown in FIG. 10.

The D stop 102 and recess 34 on the short arm 12 will stop the short arm 12 from rotating further (as will be explained in further detail below) but the window can rotate partly around the pivot point 16 past the 90° window opening to lessen the damage to the rest of the stay 1 and limit the damage to the other components so that the window can still open and shut.

Figures 13A, 13B:
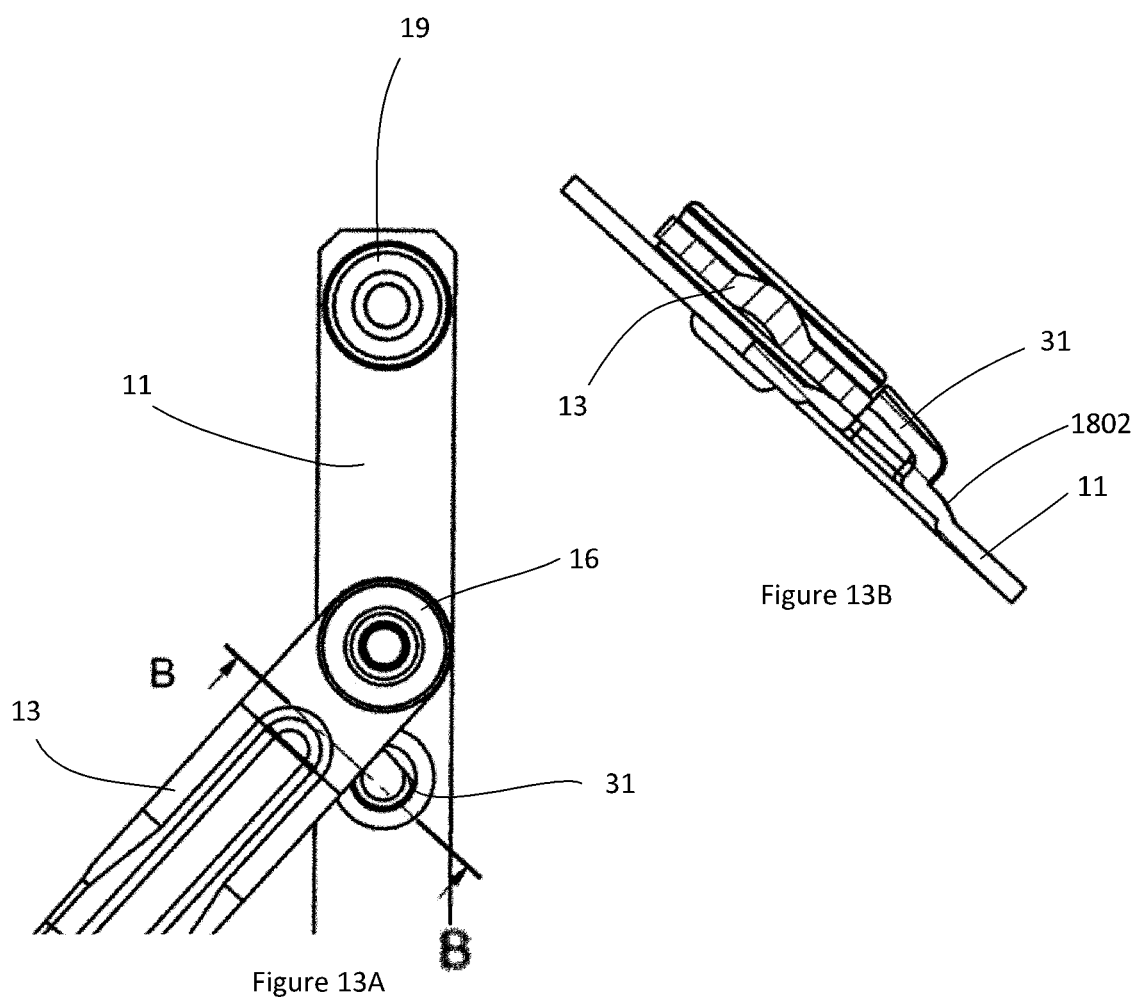

FIG. 13A shows a side view of yet another embodiment, in which a sash mounting plate 11 includes a V-shaped stop 31. The V-shaped stop 31 is also surrounded by a bulge 1802 which increases the strength of the stop 31 as described above in relation to FIGS. 12A and 12B. FIG. 13B shows a cross section through BB of FIG. 13A. As the window is opened to 90° the long arm 13 comes into contact with the sash mounting plate stop 31 on a surface of the V-shaped stop 31. Simultaneously, the D stop 102 and recess 34 on the short arm 12 meet their corresponding stop features on the frame mounting plate 10 (as will be described in further detail below under the description of the "Double-Stop").

Figure 14A:
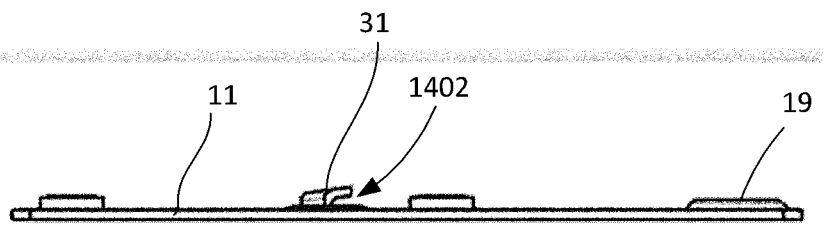
Figure 14B:
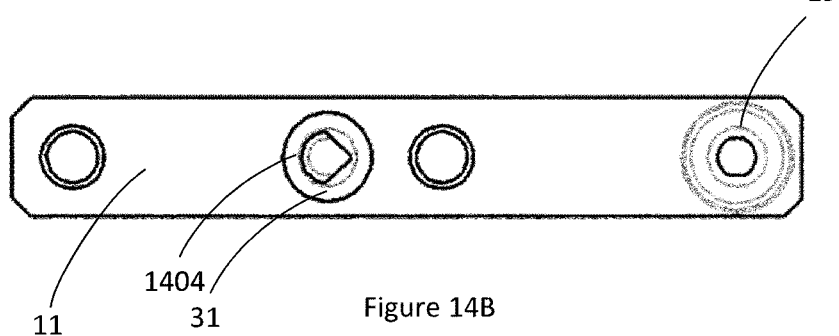
FIG. 14b is a top view of the sash mounting plate of FIG. 14A.

FIG. 14A shows a side view of a sash mounting plate 11 with a V-shaped stop 31. The side view shows how the apex/peak of the V-shaped stop is lifted from the sash mounting plate 11, leaving a space 1402 underneath the apex of the V. The V is slightly angled up away from the sash mounting plate 11 at the apex of the V. FIG. 14B shows a top view of the sash mounting plate 11 of FIG. 14A, shown the V connected to the sash mounting plate 11 at 1404.

The sash mounting plate stop 31 position can also be used to reduce or increase the angle of the window opening. the sash mounting plate stop 31 is used as a limiting stop and can moved along the centre axis of the long arm 13 to change the point of engagement between the long arm 13 and the stop 31.

The V shaped stop 31 provides a greater surface area presented to the long arm 13 when the stay 1 reaches its extreme opening angle as the arm 13 is flush with half of the edge of the V of the stop 31. Another advantage is that the V shaped stop 31 is symmetric and may be used in both left handed and right-handed stays. The V shaped stop also performs well in dynamic wind testing, and remains intact during weighted blows. In normal operation, the 'V' acts as a limit stop for standard window opening.

In the case of a larger, destructive blow, the stop 31 may act as a sacrificial weak point, allowing the stay 1 to over-open without bending the long arm 13. When the window is opened with force, the long arm 13 will override the 'V'. The 'V' is slightly angled up so the peak of the 'V' is above the top of long arm 13. At an excessive load, the 'V' will deform upwards allowing the arm to move underneath the 'V' and shear off the sacrificial top section rather than bending and damaging the long arm 13 and subsequently the frame mounting plate 10 where the load would focus. Even after this damage, the stay 1 may be closed as per normal. As the damage to the sash mounting plate stop 31 is limited to the top of the 'V' it allows the long arm to return over the bulge 1802 at the base of the stop 31 and continue normal operation without any mechanical damage caused to the long arm 13 by not being able to override the 'V'.

Double-Stop

When the stay 1 is opened, buckling of the stay 1 is prevented by the provision of two separate stops in different locations.

A D stop 102 on the short arm 12 is configured to travel inside a channel 212 in the disk 24 until it reaches the frame mounting plate 10 at the end 214 of the channel 212. When the stay and thus the window is fully opened (as shown in FIG. 3), the D stop 102 abuts the raised section 218 of the frame mounting plate 10 at the end 214 of the channel 212. The raised section 218 complements the D stop under a dynamic load. The raised section 218 raises the frame mounting plate creating a stop surface on which the D stop 102 of the short arm 12 can act. This offset provides maximum stop contact by compensating for the thickness of the plastic washer (e.g. a plastic top-hat washer) between the short arm 12 and the frame mounting plate 10. The height of this raised section 218 may equal the thickness of the washer. Other suitable analogous stop configurations may be used instead of the D stop 102. A sub-face D-Stop 102 and channel 212 prevents wearing of other components during operation of the stay.

A second stop is provided by the projection 33 from the frame mounting plate 10. The recess 34 of the short arm 12 abuts the projection 33 when the window is opened (as shown in FIG. 3). The recess 34 is of a complimentary shape to the projection 33.

The rivet 216 is fixed to projection 33 which also doubles as a fixing point for fixing the frame mounting plate 10 through the disk 24 into the window frame. The fastener which passes through the opening 226 provides added strength. In the open position a rivet flange may be situated above the short arm stop, to prevent the stop from overriding the frame mounting plate.

In another embodiment, rivet 216 can be replaced by a fastener which is inserted through the hollow projection 33 in the frame plate 10 and aperture 228 in the disk 24 and supports in the same way as rivet 216 does. In the same way rather than insert a rivet 216 or fastener, a spigot can be formed as part of the disk 24 which in use sits within hollow projection 33 and supports it in the same way as the rivet 216 and fastener would.

Disk

Referring again to FIGS. 1 to 4 disk 24 is provided, which may be formed of a lower cost material such as plastics. Preferably, the material of the disk is self-lubricating.

The disk 24 is provided with means of correctly locating the frame mounting plate 10. This means can take different forms but in the shown embodiments, it is a recess 25. The recess 25 is of a depth substantially equal to the thickness of frame mounting plate 10, and has a shape complimentary to that of the frame mounting plate 10 for locating the frame mounting plate 10.

Integrally formed in the floor 36 of the recess 25 is a stud 35 which snap locks through an opening 204 in frame mounting plate 10. The floor 36 also includes a pair of opening 38 and 39 which align with and accommodate projecting parts of pivots 14 and 17 respectively. Disks of different thicknesses can be provided so as to allow for inexpensive adaptation of the stay 1 for different cavity thicknesses. Additionally, disks may vary in depth by the inclusion of an extension of the disk behind the frame mounting plate to allow for inexpensive adaptation of the stay 1 for different cavity widths. Various additional features that can interact with the window frame can also be added to the disk to support its position for example an extension underneath that sits inside a slot on the window frame underneath the stay 1 position.

One end of the disk 24 can be provided with an area of increased thickness 26 which provides a stop against which the short arm 12 engages (preferably at the step provided by fold 20) and partially overlaps when the stay 1 is in the fully closed position.

At the other end of the disk 24 a "riser" block 27 can be provided, this block 27 forming an inclined ramp. The ramp can engage with the window sash as the window sash closes such as to directly carry the weight of the window sash and position it upon final closing of the stay. The window sash may be supported, when in the closed position, on the flat upper portion 28 of riser block 27.

In order to provide support for the underside of the long arm 13 and of the short arm 12, the disk may have as much surface area under the long arm 13 and short arm 12 as possible without impeding the closing of the sash frame.

The disk 24 thus not only provides convenience for correct location of the frame mounting plate 10 to the frame at installation but also provides other useful features connected with correct operation of the stay 1 and positioning of the sash. The disk may be polished for aesthetics.

Long-Arm

The long arm 13 includes streamlined strengthening features. The strengthening features may take the form of contours almost along the entire length of the arm. The contouring of the long arm 13 diminishes towards the end 233 of the long arm 13 configured to attach to the sash mounting plate 11, which allows the long arm 13 to slide under the sash mounting plate 11 and short arm 12 when the stay 1 is closed.

The long arm includes a central portion 210 along a substantial length of the arm; and raised or offset portions 236a and 236b on either side of the central portion 210. The elevation between the central portion 210 and the raised portions 236a, 236b decreases towards the end 233 of the arm. The top of the raised portions 236a, 236b are substantially aligned on a plane to provide support for the sash mounting plate 11.

The raised strengthening ribs 220, 222 on either side of a central strip/portion 210 extend most of the length of the long arm 13. The ribs 220, 222 are optimized to provide rigidity to the long arm 13 without obstructing the other members of the stay 1 during the operating range from closed to fully open.

The angle at which the strengthening ribs 220, 222 extend from the length of the long arm is configured to provide central portion 210 contact with the plastic disk as close as possible to the Long Arm/Sash mounting plate pivot point 16, whilst allowing the long arm 13 to pass over the short arm 12 in the closed position. In one embodiment, the angle is substantially 45 degrees (between 40 degrees and 50 degrees). The closer the support is to the pivot point 16, the higher the load it can carry without deflecting. Along the plane of the long arm 13 (the plane being parallel with the longitudinal axis of the long arm 13), as the central strip 210 rises, the ribs 220, 222 twist near the end 233, turning into flat sections 236a, 236b substantially parallel to the plane of the long arm 13. The flat sections 236a, 236b may be wide enough as not to indent the disk 24 but not so wide as to affect the height of the raised strips resulting in decreased rigidity of the arm.

The end 233 of the long arm 13 may be offset from the rest of the arm to slide under the short arm 12 as the window stay 1 closes. The offset height is determined by the cavity width between the window sash and frame.

The arm is formed from a coil of parallel slit strip. The width of the formed arm is determined by the angle that the ribs 220, 222 are bent to.

Rivet Structure

Figure 5A:
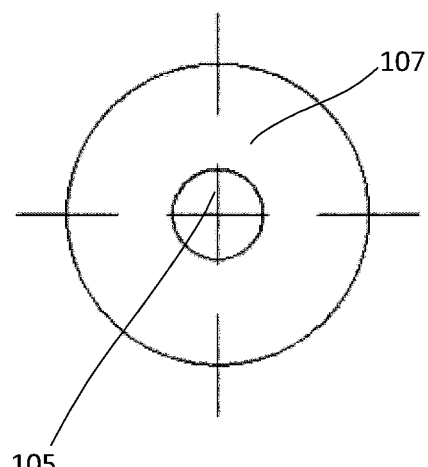
FIG. 5a is a top view of a rivet.
Figure 5B:
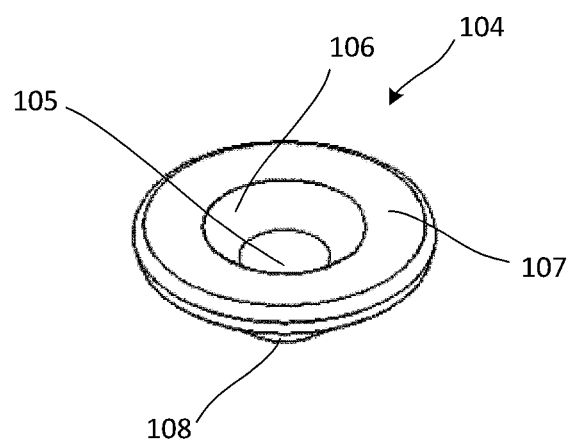
Figure 5C:
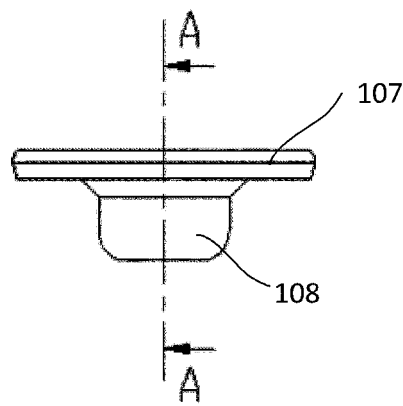

FIG. 5a is a top view of a rivet. FIG. 5b is a perspective view of the rivet of FIG. 5a, FIG. 5c is a side view of the rivet of FIG. 5a, and FIG. 5d is a sectional view through A:A of FIG. 5c.

The Rivet 104 has a head 107, neck 106, shaft 108 and a central aperture 105. The head 107 is positioned on the first side of a pivot point, and the shaft 108 and tail 109 are fastened to the other side of the pivot point. The neck 106 tapers outwardly from the shaft 108 to the head 107.

Figure 5D:
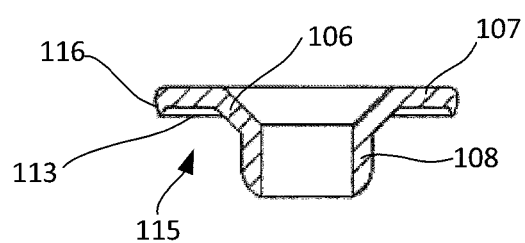
FIG. 5d is a sectional view through A-A of FIG. 5c.
Figure 5E:
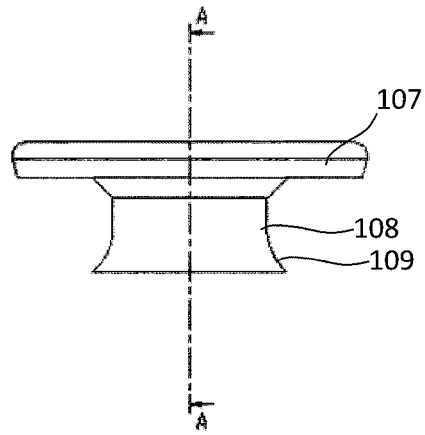
FIG. 5e is a side view of the rivet as assembled on the stay.
Figure 5F:
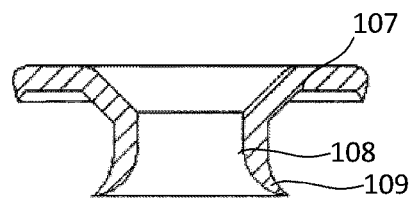
FIG. 5f is a sectional view through A-A of FIG. 5e.

FIG. 5e is a side view of the rivet as assembled on the stay 1 and FIG. 5f is a sectional view through A:A of FIG. 5e. As shown in FIGS. 5e and 5f, a rivet tail 109 tapers outwardly from the substantially tubular shaft 108 after forming the pivot point joint. When the rivet is manufactured by itself the tail actually curls in the opposite direction (towards the central aperture) as in FIG. 5d. Then when the plates and washers are riveted together the tail 109 is formed over as shown in 5f. This retains all the components and maintains the tension of the joint which in turn generates the integral friction of the pivot point.

As is visible in FIG. 5d, the inside or underside 115 of the rivet head 107 is generally concave. The underside 115 of the rivet head 107 includes a recess 113 surrounded by a lip 116. The depth of the recess 113 is configured to prevent the washer from extruding outwards under load but not to exceed 50% of the washer thickness as to allow for wear (between ⅓ and ½ of the washer thickness). This shape helps to resist extrusion of the washer outwards by providing a physical barrier to the extrusion of the washer. The lip 116 of the recess 113 reduces the available area for the washer to extrude radially out from the rivet shaft 108 under load. Thus the rivet can support heavier loads.

Rivet Method of Manufacture

Typically pressed rivets are drawn in a single direction (conventionally downwards) in manufacturing. The central aperture 105 is pierced down to evacuate the slug. In the final blanking stage, the rivet is again blanked in the same direction (downwards) resulting in the break facing up and a rounded (washed out face) bearing on the washer.

A method of manufacturing a rivet is provided as follows:
  The rivet is drawn in a series of stages according to known methods, in which the central aperture 105 of the rivet is pierced and the neck 106 is at least partially formed.
  The final blanking stage of the outer diameter (disconnection from strip) is carried out at 180 degrees to the previous stages (at 180 degrees to the central aperture 105).

Figure 6:
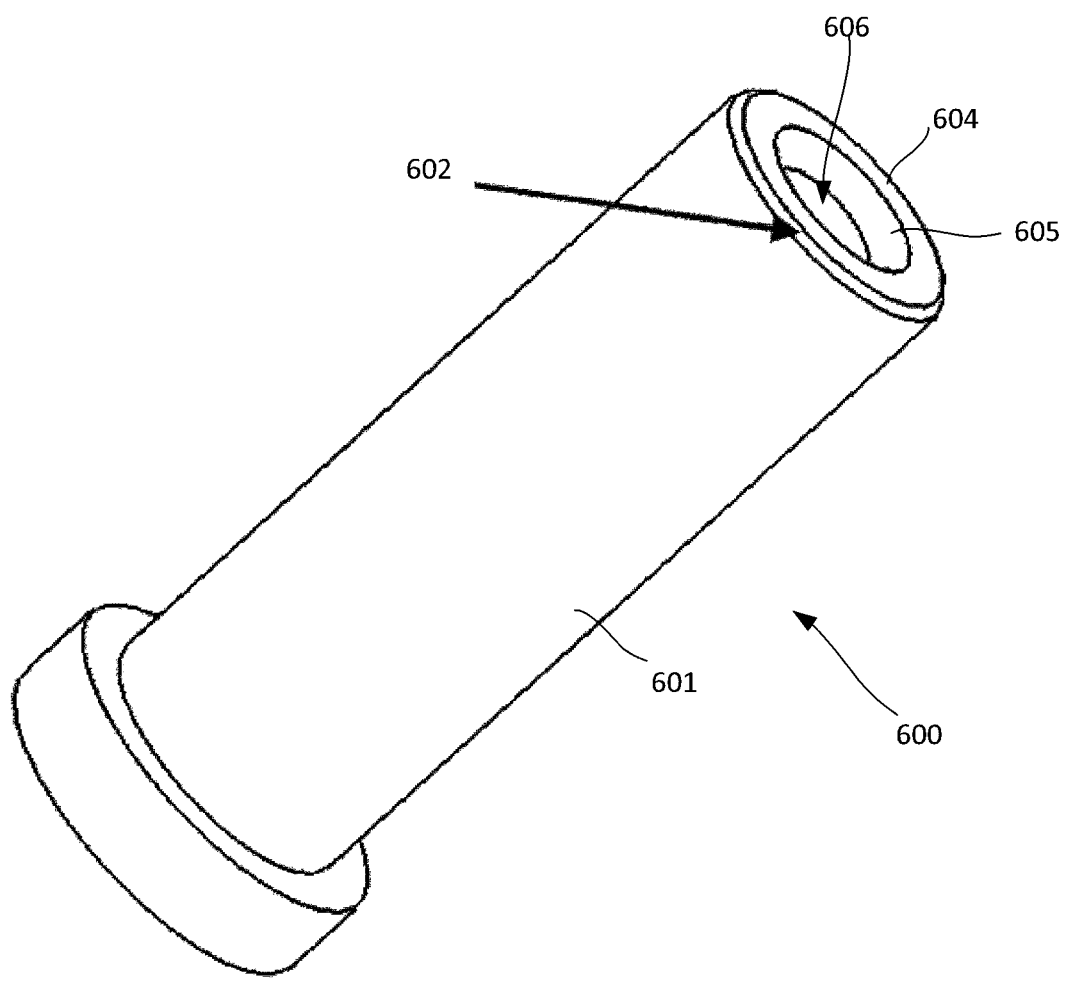
FIG. 6 is a perspective view of a blanking punch.

FIG. 6 is a perspective view of a blanking punch 600 for the final blanking stage according to one embodiment. The blanking punch 600 includes a central aperture 606, and a body 601. The body 601 includes a top flat surface 604, and a chamfer 602. An inner surface 605 of the blanking punch 600 supports the rivet. The neck 106 will have at least been partially formed before the final blanking stage, and the inner surface 605 will complete the final finishing form of the neck 106 during the blanking process. The diameter of the aperture 606 corresponds to the outer diameter of the shaft 108 of a rivet. The chamfer 602 of the blanking punch 600 is of a complimentary shape to the desired shape of the lip 116 of the rivet. The chamfer 602 creates the lip 116 which retains the washer and prevents extrusion of the washer.

The top surface 604 of the blanking punch 600 may have any suitable form to create a washer-retaining cavity in the underside of the rivet head. For example, in other embodiments, the top surface 604 may be rounded.

Washer Configuration

Figure 15:
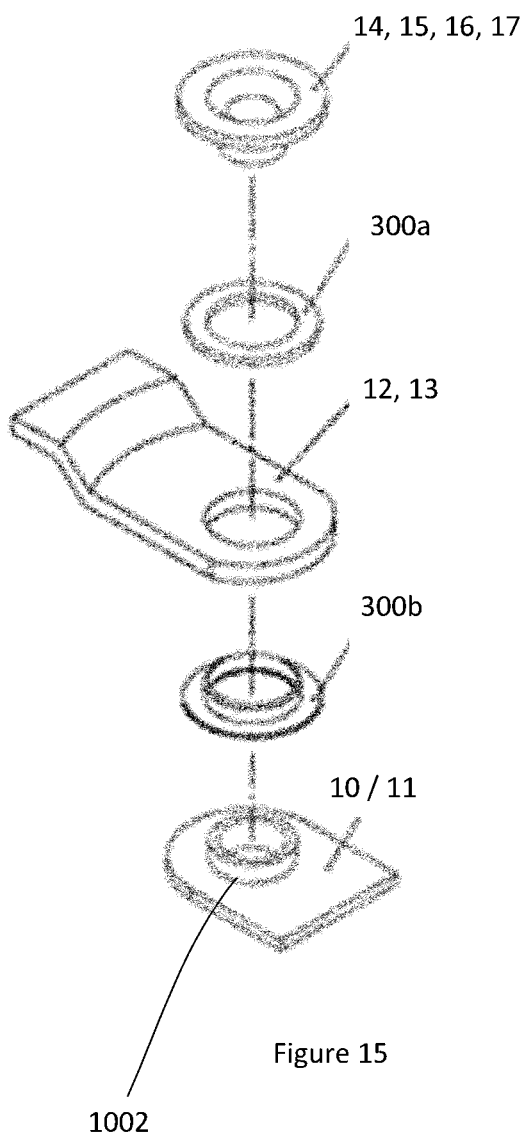
FIG. 15 is an exploded view of a joint of the window stay 1 according to an exemplary embodiment.

In the embodiments of FIGS. 1 to 4, two washer per joint are provided (a top-hat and a flat washer). FIG. 15 shows a detailed view of a joint between a short arm 12 or long arm 13 with a frame mounting plate 10 or sash mounting plate 11. A rivet (14, 15, 16 or 17) is stacked through a flat washer 300a, through an aperture in the short arm 12 or long arm 13, through a top hat washer 300b which surrounds a boss 1002 in the frame mounting plate 10 or sash mounting plate 11. To assemble, the top-hat washer 300b is inserted into the arm (12, 13). The arm (12, 13) and washer 300b are placed onto the boss 1002 on a frame mounting plate 10 or sash mounting plate 11. Then the top washer 300a is put on with the rivet (14, 15, 16 or 17) and pressed.

In another embodiment, a tooling method moulds washers directly onto short arms 12 and long arms 13. With this insert molded design, there is no need to add separate washers. The arms only need to be fitted onto the frame mounting plate 10 or sash mounting plate 11 bosses 1002, and the rivets (14, 15, 16 or 17) are placed through the pivot points and pressed. This also avoids the need for additional machinery such as a washer loader. Thus, the insert molded washer embodiment saves labour and machinery costs. The washers can be made from a variety of plastics depending on the function required for the stay 1 product.

Figure 16:
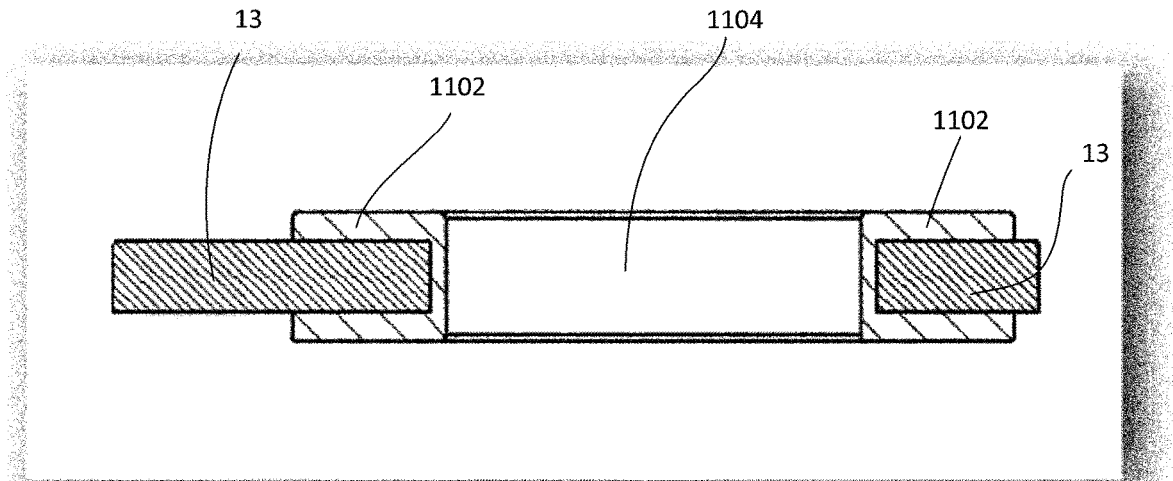
FIG. 16 is a cross sectional view through an aperture in a long arm the window stay 1 according to an exemplary embodiment.

FIG. 16 shows an end of a long arm 13 including an insert molded washer 1102. This shows the washer 1102 wrapping through the aperture 1104 in the long arm 13. In the simplest form the washer can be insert moulded to the long arm 13 without any additional features on either part.

Figure 17:
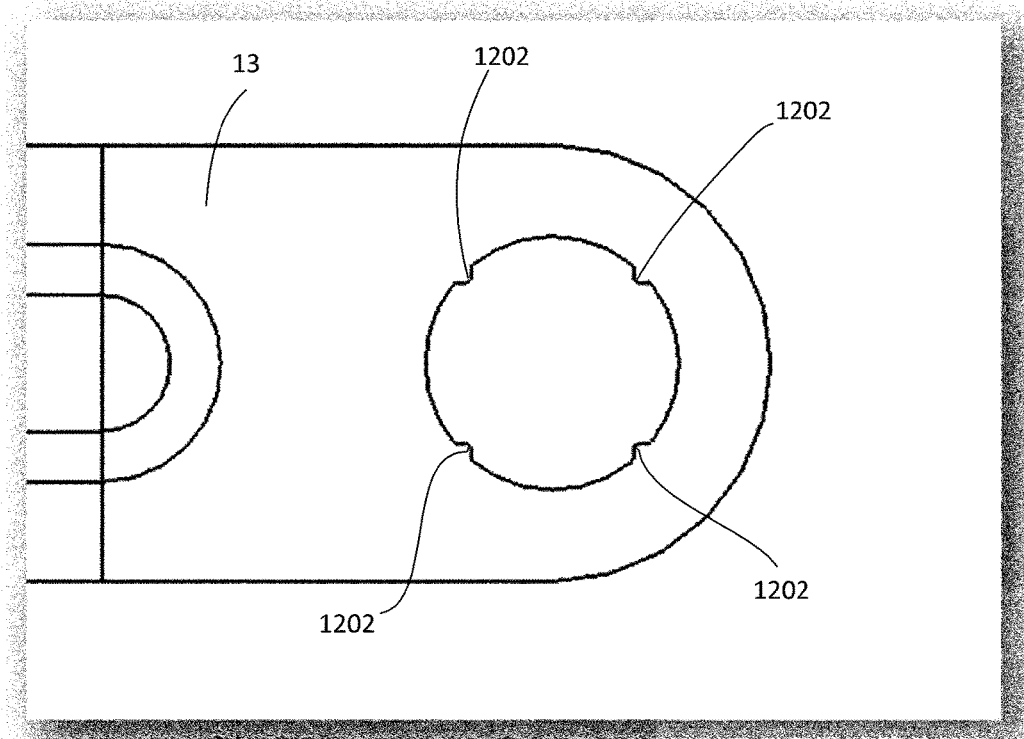
FIG. 17 is a top view of a pivot aperture of the long arm of FIG. 16.

FIG. 17 shows a top view of a long arm 13 with features to improve the interaction between the washer 1102 and the long arm 13. To stop the washer from turning on the arms, the interior of the aperture 1104 inside the long arm 13 is shaped to retain the washer relative to the arms. In the shown embodiment, the aperture 1104 of the arm includes four protrusions 1202. When the washer is moulded directly onto the arm, these four protrusions 1202 are embedded into the washer holding it in place. The protrusions 1202 are also used to locate the arms centrally in the plastic mould tool so that the washers are moulded central to the hole during the moulding process.

The size and shape of the protrusions could increase or decrease in width or height as can the number of protrusions around the aperture 1104.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

What is claimed is:

1. A window stay, including:
   a short arm coupled by pivots at each end to the frame mounting plate and the sash mounting plate; and
   an elongate long arm coupled by pivots at each end to the frame mounting plate and sash mounting plate,
   wherein the stay includes a first stop and a second stop, each acting between the short arm and the frame mounting plate as limiters at a fully open position of the window stay to substantially reduce buckling of the window stay at the fully open position;
   wherein the second stop is a projection from the short arm configured to engage with the frame mounting plate.

2. The window stay of claim 1 wherein the first stop is a projection from the frame mounting plate configured to engage with the short arm.

3. The window stay of claim 2 wherein the projection from the frame mounting plate is configured to engage with a recess in the short arm.

4. The window stay of claim 1 wherein the second stop is configured to engage with a perimeter of the frame mounting plate.

5. The window stay of claim 1 wherein the frame mounting plate is engaged with an elongate disk having longitudinal edges and the disk includes a channel in which the second stop travels as the stay moves between closed and open positions.

6. The window stay of claim 1 wherein the geometry of the stay is such that, in a closed position of the stay, the pivot coupling the long arm to the sash mounting plate is situated between the pivot coupling the frame mounting plate to the short arm and the pivot coupling the sash mounting plate to the short arm.

7. The window stay of claim 1 wherein the sash mounting plate includes a sash mounting plate stop to act as a limiter at the fully open position of the stay.

8. The window stay of claim 7 wherein the sash mounting plate stop is a projection from the sash mounting plate configured to stop the long arm and/or the sash mounting plate stop is surrounded by a bulge in the sash mounting plate.

9. The window stay of claim 1 wherein the frame mounting plate includes a pressed form along a longitudinal edge of the frame mounting plate and/or at a high-load area of the frame mounting plate.

10. The window stay of claim 9 wherein the pressed form includes folds extending the frame mounting plate in both directions from a primary plane of the frame mounting plate.

11. A window stay, including:
    a frame mounting plate;
    a sash mounting plate;
    a mounting, wherein the mounting is configured to attach the frame mounting plate to a window frame, and the mounting includes a bearing surface; and
    a long arm including:
    a central portion along a substantial length of the long arm; and
    offset portions on either side of the central portion, wherein the central portion is substantially flat and configured to substantially bear on the bearing surface of the mounting near a pivot between the long arm and the sash mounting plate at least in a closed position of the window stay.

12. The window stay of claim 11 wherein the elevation between the central portion and the offset portions decreases towards an end of the arm.

13. The window stay of claim 11 wherein the central portion is an elongate strip.

14. The window stay of claim 11, wherein the offset portions are ribs angled at between 40 to 50 degrees relative to a plane of the arm.

15. The window stay of claim 11, including:
- a short arm including apertures to couple by pivots at each end to the frame mounting plate and a sash mounting plate of the window stay;
- wherein the long arm includes apertures to couple by pivots at each end to the frame mounting plate and sash mounting plate; and
- wherein the window stay further includes a washer integrally moulded onto one or more of the apertures.

16. The window stay of claim 15 wherein the apertures are shaped to retain the washers relative to the arms.

17. The window stay of claim 15 wherein the apertures include protrusions which retain the washers relative to the arms.

* * * * *